(12) United States Patent
Kabs et al.

(10) Patent No.: US 6,974,719 B2
(45) Date of Patent: Dec. 13, 2005

(54) METHOD FOR MANUFACTURING AN OPTICAL MODULE AND OPTICAL MODULE

(75) Inventors: Joachim Kabs, Leonberg (DE); Ingo Karla, Schermbeck (DE)

(73) Assignee: Avanex Corporation, Fremont, CA (US)

( * ) Notice: Subject to any disclaimer, the term of this patent is extended or adjusted under 35 U.S.C. 154(b) by 146 days.

(21) Appl. No.: 10/309,087

(22) Filed: Dec. 4, 2002

(65) Prior Publication Data

US 2003/0133690 A1 Jul. 17, 2003

(30) Foreign Application Priority Data

Jan. 7, 2002 (EP) .............................................. 02360003

(51) Int. Cl.⁷ .............................................. H01L 21/76
(52) U.S. Cl. .............................. 438/89; 438/27; 438/69
(58) Field of Search ......................... 385/137; 257/432; 438/20–55

(56) References Cited

U.S. PATENT DOCUMENTS

| | | | |
|---|---|---|---|
| 5,037,199 A | * | 8/1991 | Hlousek ..................... 356/246 |
| 5,124,281 A | | 6/1992 | Acketman et al. |
| 5,178,319 A | | 1/1993 | Coucoulas |
| 5,178,723 A | * | 1/1993 | Nguyen ....................... 216/24 |
| 5,389,193 A | | 2/1995 | Coucoulas et al. |
| 5,415,730 A | | 5/1995 | Canning et al. |
| 5,933,707 A | * | 8/1999 | Ayliffe et al. ............... 438/107 |
| 5,995,293 A | * | 11/1999 | Derkits et al. .............. 359/642 |
| 6,117,794 A | * | 9/2000 | Dormer et al. ............. 438/745 |

FOREIGN PATENT DOCUMENTS

| | | |
|---|---|---|
| EP | 0 529 953 A1 | 3/1993 |
| EP | 0 542 444 A1 | 5/1993 |
| EP | 0 682 276 A1 | 11/1995 |
| EP | 0 913 717 A1 | 5/1999 |
| EP | 0 959 147 A2 | 11/1999 |

* cited by examiner

*Primary Examiner*—Frank G. Font
*Assistant Examiner*—Erin D. Chiem
(74) *Attorney, Agent, or Firm*—Moser, Patterson & Sheridan (57) ABSTRACT

The invention relates to an optical module and to method for manufacturing an optical module comprising the steps of: providing a groove in a substrate for positioning an optical component, providing the optical component, bonding the optical component to the groove by means of an aluminium-oxide bonding process, whereby an aluminium layer is formed on a lower portion of the optical component.

12 Claims, 7 Drawing Sheets

METHOD FOR MANUFACTURING AN OPTICAL MODULE AND OPTICAL MODULE

FIELD OF INVENTION

The present invention relates to the field of fabrication of optical modules on a substrate, and more particularly to the usage of an aluminium oxide bonding process for bonding of optical components to the substrate. The invention is based on a priority application EP 02 360 003.4 which is hereby incorporated by reference.

BACKGROUND AND PRIOR ART

It is known from the prior art to use epoxy glue to affix a ball lens of an optical submount. Usage of epoxy glue has several disadvantages:

- the epoxy glue is aging and has a poor long term reliability,
- the stability of the epoxy glue is strongly decreasing at high temperatures,
- the process of gluing a ball lens by means of epoxy glue is both time consuming and expensive as it is difficult to apply a tiny quantity of epoxy glue below the ball lens,
- the position of the ball lens is defined with a greater tolerance in comparison to the tolerance which is achievable by anorganic attachment. This is because a substantial quantity of epoxy glue is required for gluing the ball lens which creates a greater tolerance with respect to the exact position.

As far as anorganic attachment is concerned it is as such known from the prior art to utilize an aluminiumaluminium-oxide bonding process:

U.S. Pat. No. 5,178,319 shows compression bonding method for permanently bonding elements such as glass spheres and optical fibers to aluminium surfaces of substrates by applying pressure along with energy to the interface of the element and the aluminium. For example, a glass sphere is bonded by pressing it against aluminium while heating the aluminium. As an alternative to heating, acoustic energy can be applied to the sphere along with the pressure. Glass optical fibers can be bonded to aluminium surfaces in the same manner. The publication "AlO bonding: a method of joining oxide optical components to Al coated substrates", Coucoulas at el 1993, IEEE conference proceedings, shows a similar method.

This process requires that an aluminium layer is deposited in a processing step when the substrate is structured. Thus the aluminium layer is exposed to several aggressive processing steps such as exposure to acids, reflow at temperatures around 300° C., etc. Such processing steps deteriorate the quality of the aluminium surface. This is a substantial problem as the aluminium-oxide bonding technique requires a contact between oxide, such as $SiO_2$, and pure non-oxidized aluminium. As a consequence the quality of the aluminium-oxide bond formed between the ball lens and the substrate is decreased because of such processing steps to which the aluminium layer is subjected.

U.S. Pat. No. 5,124,281 describes a method of making a V-groove such that a spherical lens can be precisely located within it: A laser is mounted on a planar surface of a monocrystalline silicon mounting member. A spherical lens is mounted in a monocrystalline silicon cover member which, when abutted and registered to the mounting member, aligns the spherical lens with the laser so that the output light can be projected along a precise predetermined path.

The spherical lens is mounted in a V-shaped groove which is made in the cover member by masking and etching. A second V-shaped groove intersects the first groove and defines a V-shaped edge in one side of the first groove. The spherical lens is then seated in the first V-shaped groove such that it bears against two points of the V-shaped edge and against one side wall of the first V-shaped groove. A second lens is mounted in the cover member in the same manner as the first lens and directs laser light from a rear facet of the laser to a mirror 30 and hence to a photodetector mounted in the cover member.

From U.S. Pat. No. 5,933,707 a further method for crystal substrate processing is known. An anisotropic silicon etchant is used in a processing stage to form precision machined features in the substrate. Prior to the use of the etchant a masked layer of organic dielectric is applied to the substrate. The dielectric protects surface features previously defined. By etching the I/Os in the final passivation prior to the deposition of solder, the application of the organic dielectric protective layer and the etching of the V-grooves, the etchant is prevented from accessing the opened I/Os and the number and complexity of the patterning stages is thereby reduced.

SUMMARY OF THE INVENTION

The present invention provides for an improved method for manufacturing an optical module as claimed in the independent claims. Preferred embodiments of the invention are set forth in the dependent claims.

It is a particular advantage of the present invention that the deposition of an aluminium layer from the front side of the substrate can be avoided. Rather the aluminium layer is either deposited from the backside of the substrate through a hole formed in the backside by the positioning groove or the aluminium layer is formed on a portion of the optical component itself prior to positioning the optical component within the groove.

In accordance with a preferred embodiment of the invention the substrate, i.e. the wafer, is etched in an anisotropic way to form a deep V-groove for providing an opening at the backside of the substrate. This etching step enables to accurately align the optical component to be bonded whereas the opening is used as a backside access for deposition of the aluminium layer.

In accordance with a further preferred embodiment of the invention the attachment of the optical component to the substrate is achieved by using aluminium deposition (like vapour deposition or sputtering) such that an aluminium layer is formed on the substrate backside and extending through the opening onto the lower portion of the optical component. This way the contact area of the aluminium layer and the optical component is much larger in comparison to the prior art where only point contacts are formed.

In accordance with a further preferred embodiment of the invention the aluminium layer is formed on the backside of the substrate during one of the final processing steps of the manufacturing of the optical module, such as during the assembly part of the manufacturing process. This is made possible by the present invention as the aluminium layer is not part of the submount structurization itself. This has the further advantage that the aluminium surface is not subjected to any of the aggressive processing steps which are required for the submount structurization and therefore remains intact to form a good bonding with the oxide on the surface of the optical component.

It is a further advantage of the present invention that it can be employed with respect to an existing manufacturing process of an optical module as the bonding step is performed after the sub-mount structuralization. This way the technical difficulty of integrating the deposition of an aluminium layer into the submount structurization can be avoided. Preferably backside bonding is performed after finalizing the structurization of the submount. Using the backside attachment approach there is no need for an attachment layer on the same side as the structured surface in accordance with this preferred embodiment.

In accordance with a further preferred embodiment of the invention the wafer is etched anisotropically at defined positions to create V-shaped grooves forming openings at the wafer backside. The creation of the grooves by anisotropic etching enables an accurate alignment of the optical components with respect to the optical axis whereas the opening formed on the wafer backside allows a backside access which is used for the bonding process.

In accordance with a further preferred embodiment the aluminium layer is deposited by bringing the whole wafer with placed optical components into an aluminium evaporation chamber in order to vapour deposit an aluminium layer on the wafer backside. Subsequently a heat treatment of the aluminium layer can be performed in order to increase the adhesion.

Further an additional metal layer can be deposited on the aluminium layer in order to increase the material strength of the joint between the optical component and the substrate. However the initial strength of the aluminium layer which covers the submount backside as well as the lower portion of the optical component already provides for a stable bonding.

In accordance with a further preferred embodiment of the invention the individual submounts of the wafer are separated after the deposition of the aluminium layer and the bonding.

It is a particular advantage of the present invention that the oxidation of the aluminium layer can be avoided and that the purer aluminium surface leads to a larger attachment strength during the aluminium oxide bonding process. Further the contact area between the aluminium adhesion layer and the optical component is larger than in former solutions.

In case the aluminium surface is covered by aluminium oxide the application of pressure is required in order to crack the aluminium oxide layer. This way elementary aluminium is exposed to the silicon oxide layer for the aluminium oxide bonding process. It is to be noted that the application of pressure is not necessary if the aluminium is not exposed to the atmosphere as in this case no aluminium oxide layer is formed.

As an alternative to the aluminium oxide bonding it is also possible to form the bonding by means of physical adhesion forces rather than by means of a chemical reaction. This is made possible because the contact area between the aluminium adhesion layer and the optical component is relatively large.

In accordance with a further preferred embodiment of the invention an aluminium layer is formed on a lower portion of the optical component to be bonded prior to placing the optical component within the groove of the substrate. The formation of the aluminium layer on the lower portion of the optical component can be accomplished by means of a standard evaporation equipment by placing the optical component on top of mask or a grid with small openings. The small openings serve to receive the lower portions of the optical components in order to vapour deposit the aluminium from the backside of the mask or grid.

The optical component with the aluminium layer on its lower portion is subsequently placed in a V-groove of the substrate. Typically the walls of the V-groove are already covered with an silicon oxide ($SiO_2$) layer. The optical component is bonded to the V-groove, for example by a step of thermo compression bonding.

This embodiment of the invention has the advantage that it is not necessary to provide an opening in the wafer backside. This means that the fabrication method of the present invention can be applied to existing designs of optical modules without a requirement for a major re-design of the optical module. When the present invention is applied to a prior art optical module the precision of the positioning of the optical component can be increased substantially. This is because in the prior art epoxy glue is used to affix the optical component which means relatively large tolerances. As the inverted aluminium oxide bonding process is used in this embodiment the requirement for epoxy glue is eliminated such that the positioning of the optical component is extremely accurate.

When the optical component is placed in the V-groove the application of pressure is required when the optical component with the aluminium layer was exposed to the atmosphere as this immediately oxidises the aluminium layer. By means of the pressure the aluminium oxide layer is cracked in order to bring pure aluminium and silicon dioxide into direct contact. For the inverted aluminium oxide bonding process it is preferable to apply a temperature in order of 300° Celsius such that the chemical bond is formed at an convenient reaction speed.

It is to be noted that the invention can be advantageously employed for the bonding of optical components as described here in. However the invention can also be used for bonding of other components provided that such other components have an outer oxide layer to perform the aluminium oxide bonding process.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS

Figure 1:
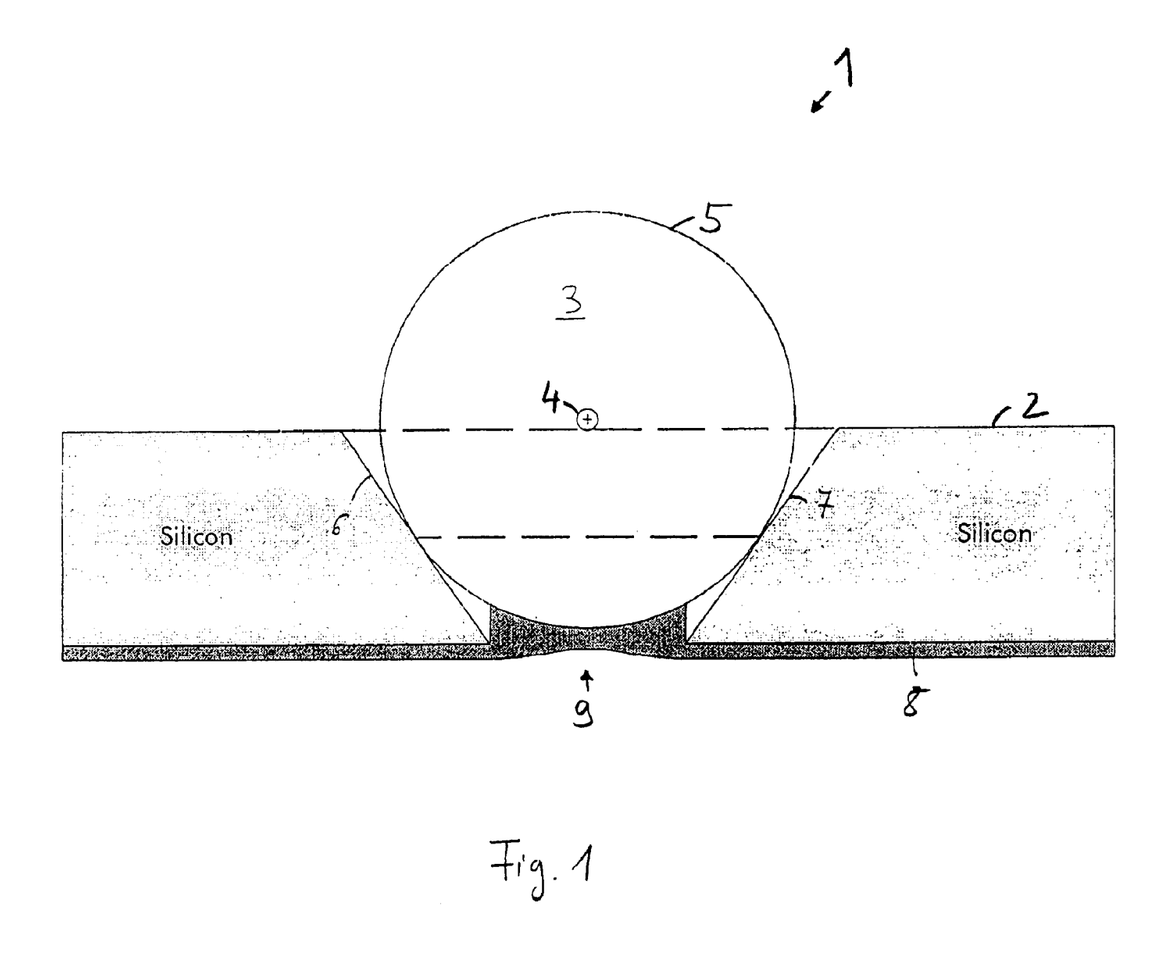
FIG. 1 is a side sectional view of a first embodiment of an optical module in accordance with the invention.

FIG. 1 shows an optical module 1 comprising a silicon substrate 2 and an optical component such as a ball lens 3. The ball lens 3 has an optical axis 4. An oxide layer 5 is deposited on the surface of the ball lens 3. The oxide layer 5 can be a part of an anti-reflective coating. Typically the oxide layer 5 is formed of $SiO_2$.

A groove is formed in the silicon substrate 2 having walls 6 and 7. Preferably the groove is formed by anisotropically etching the silicon substrate 2 such that the walls 6 and 7 have a defined inclination angle such that the positioning of the ball lens 3 within the groove is accurately determined. This is especially important for exactly positioning the optical axis 4.

In order to affix the ball lens 3 to the silicon substrate 2 in its position defined by the walls 6 and 7 the ball lens 3 is placed within the groove formed by the walls 6 and 7.

Aluminium is deposited from the backside of the silicon substrate 2 to form an aluminium layer 8. As the walls 6 and 7 leave an opening 9 in the backside of the silicon substrate 2 the aluminium layer 8 is deposited both on the backside of the silicon substrate 2 and on a lower portion of the ball lens 3. In this way a coherent aluminium layer 8 is formed which extends through the opening 9 onto the lower portion of the ball lens 3 forming a bond with the oxide layer 5 on the lower portion of the ball lens 3. Preferably the aluminium layer 8 is heated in a subsequent solder process to increase the adhesion between the aluminium layer 8 and the oxide layer 5.

Figure 2:
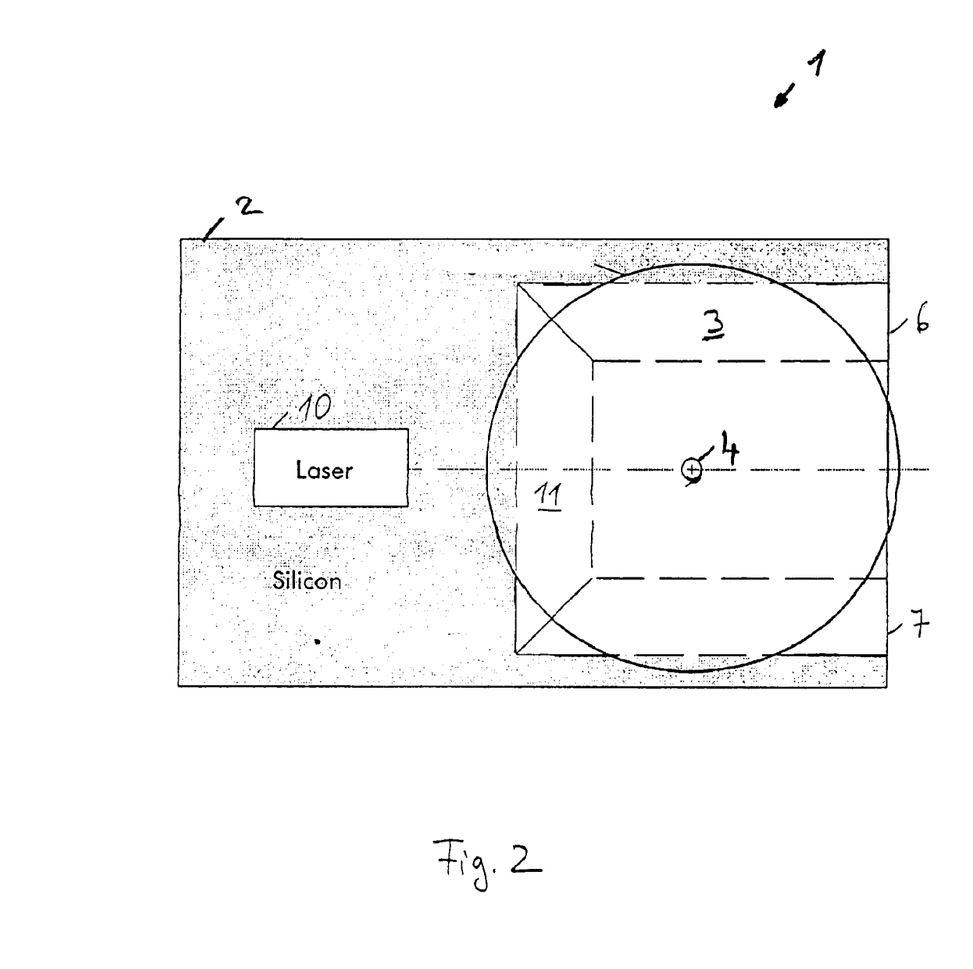
FIG. 2 is a top view of the optical module of FIG. 1.

FIG. 2 shows a top view of the optical module 1. The optical module 1 has a laser 10. The ball lens 3 is placed within the groove formed by the walls 6 and 7 and is affixed to the silicon substrate 2 of the optical module 1 as explained with respect to FIG. 1. In the horizontal direction the ball lens 3 is positioned with respect to the wall 11 formed between the walls 6 and 7. This way the optical axis of the ball lens 3 is in alignment with the laser 10.

Figure 3:
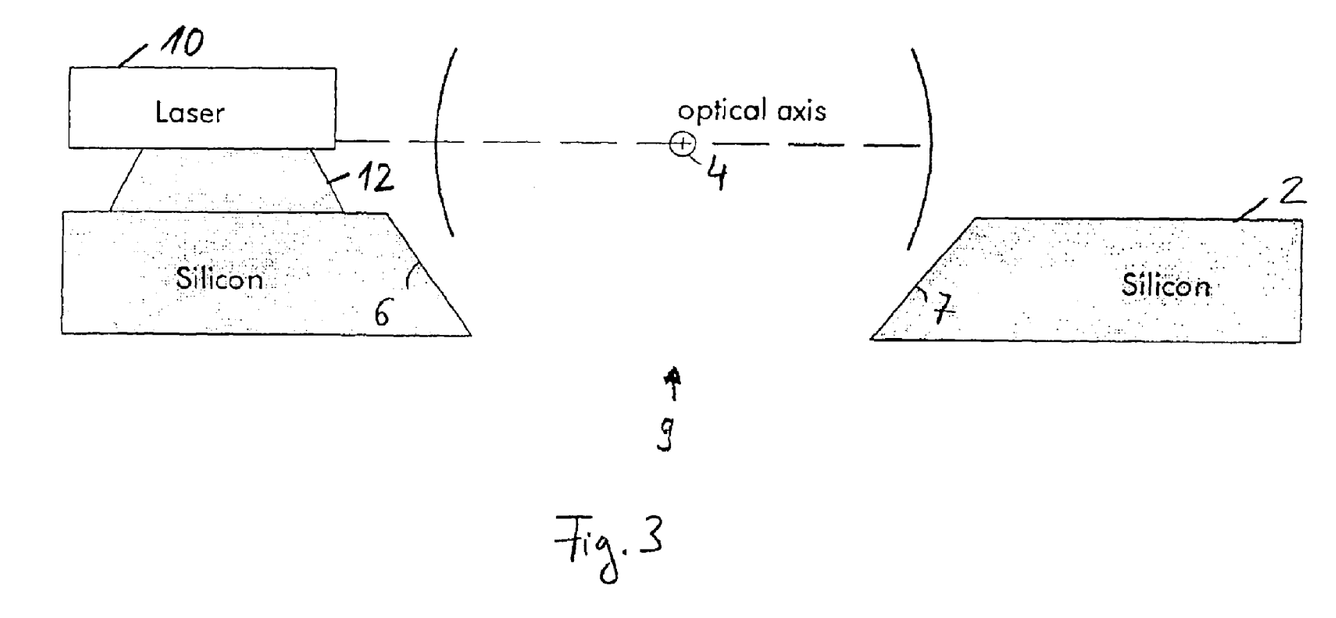
FIG. 3 is a second side sectional view of the optical module of FIGS. 1 and 2.

In accordance with the preferred embodiment of FIG. 3 the laser 10 is placed on an underlayer 12 such as a stand-off or a base for alignment with the optical axis 4 in a vertical direction.

Such an underlayer 12 may be necessary for vertically aligning the laser 10 and the optical axis 4, depending on the laser soldering process or other optoelectronic issues of the module, like laser monitoring or other additional features.

Figure 4:
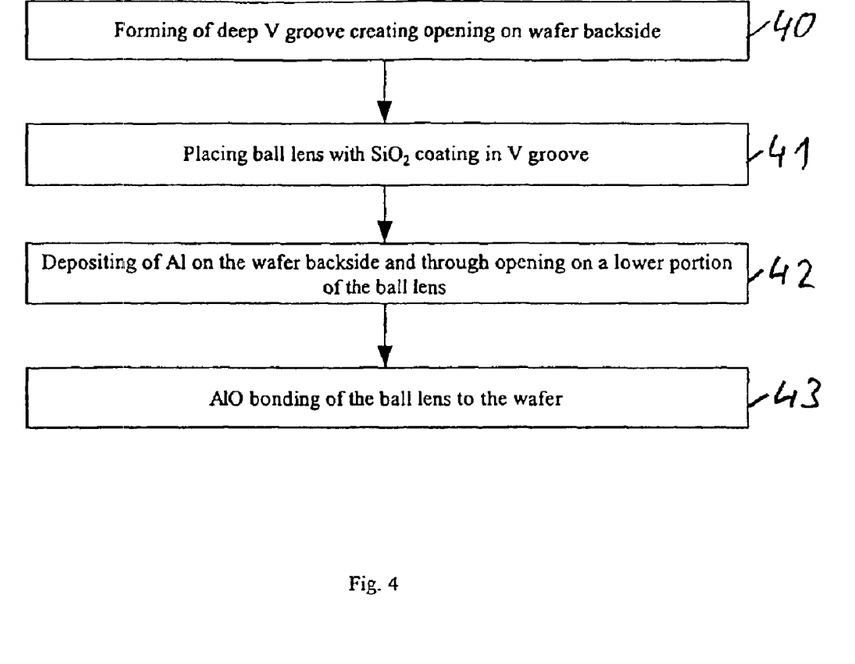
FIG. 4 is illustrative of an embodiment of a method for manufacturing an optical module.

FIG. 4 is illustrative of a corresponding manufacturing process. In step 40 a deep V-groove is formed in the wafer. The V-groove is deep enough to create an opening on the wafer backside.

In step 41 an optical component, such as a ball lens, is placed in the V-groove. The ball lens can have an antireflective coating containing an outer oxide layer (e.g. SiO2).

In step 42 an aluminium layer is deposited from the wafer backside, for example by means of vapour deposition (or sputtering). The aluminium layer formed this way extends over the wafer backside and through the opening onto the lower portion of the ball lens. This way a bonding of the ball lens to the wafer is formed in step 43. Preferably the aluminium layer is heated subsequently in order to increase the strength of the bonding. Further it is possible to form an additional metal layer on the aluminium layer on the wafer backside for increased strength of the structure.

Figure 5:
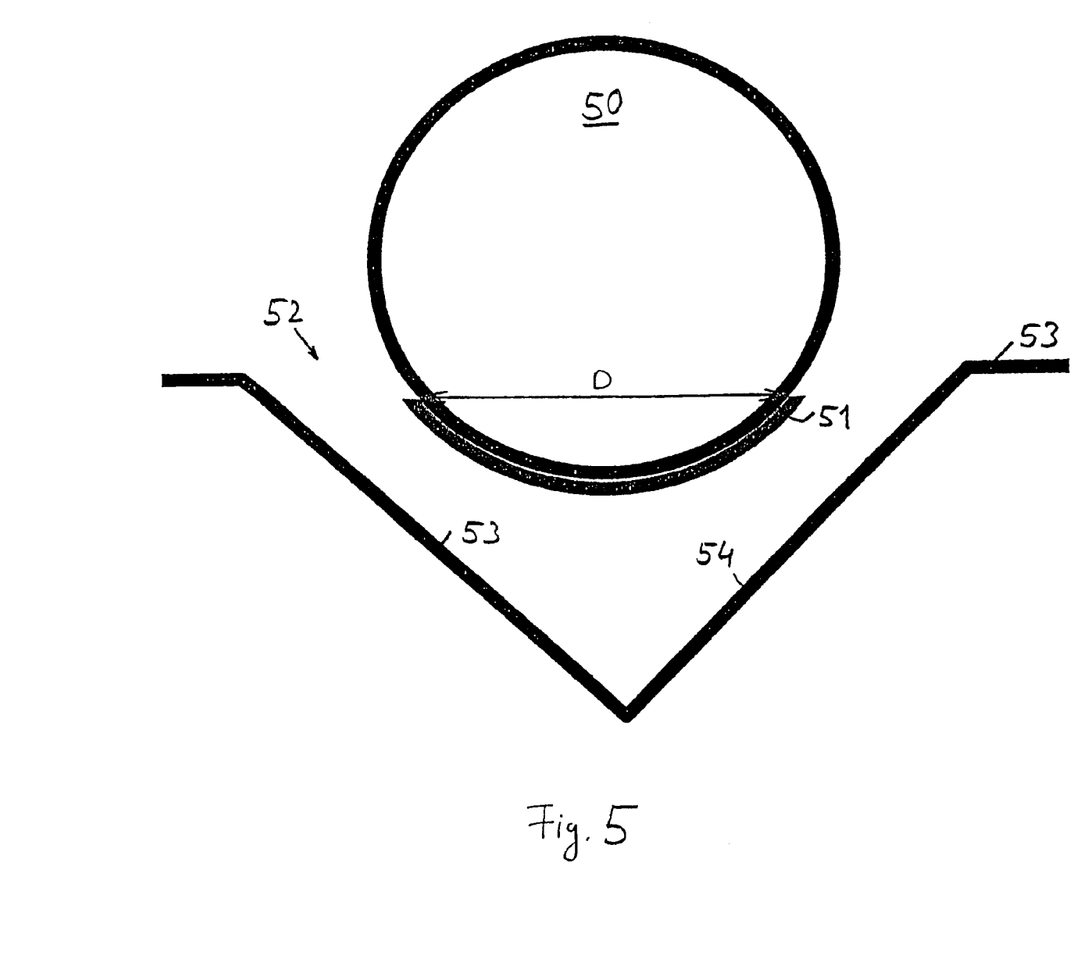
FIG. 5 is a schematic side sectional view of a second embodiment of an optical module in accordance with the invention.

FIG. 5 shows a schematic diagram of an alternative embodiment of the invention. An optical component such as a ball lens 50 has an aluminium layer 51 on its lower portion. The ball lens 50 is to be placed within the V-groove 52 of the silicon substrate 53. The walls 53 and 54 of the V-groove 52 have an oxide coating, such as an $SiO_2$ coating. This way—when the ball lens 50 is placed within V-groove 52—a contact is formed between the aluminium layer 51 on the lower portion of the ball lens 50 and the oxide layer on the walls 53 and 54 of the V-groove 52. This contact is used for a subsequent aluminium-oxide bonding of the ball lens 50 to the V-groove 52, such as by thermo compression.

Figure 6:
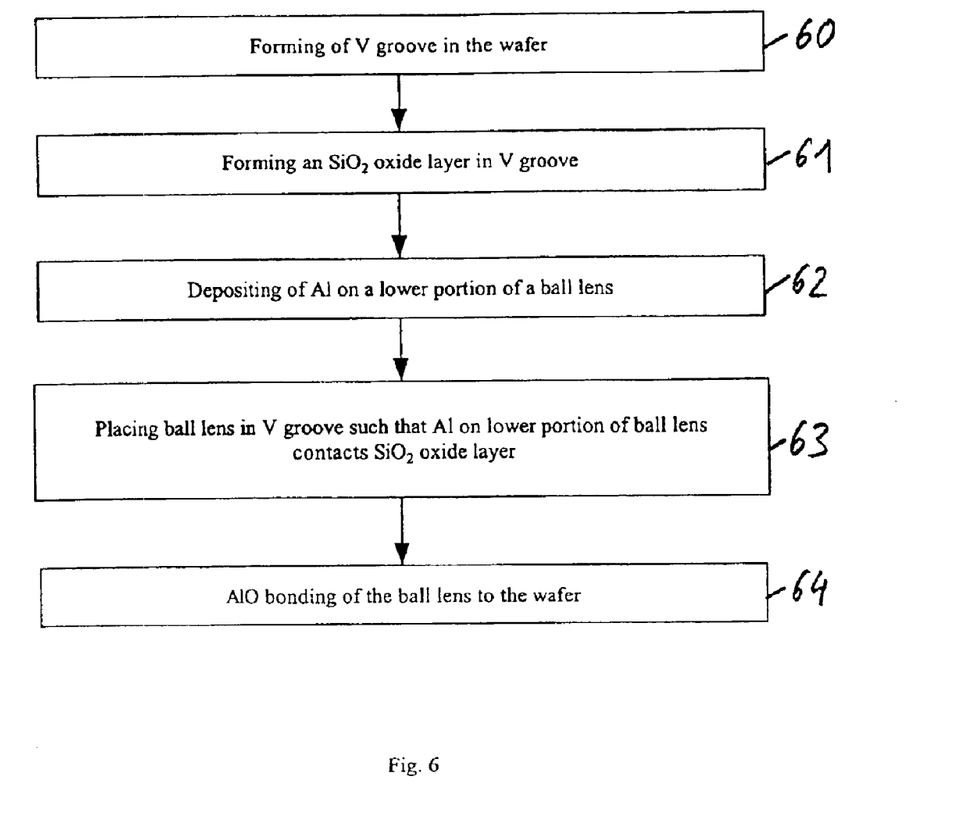
FIG. 6 is illustrative of a second embodiment of a method for manufacturing an optical module in accordance with the invention.

FIG. 6 is illustrative of a corresponding manufacturing method. In step 60 a V-groove is formed in the wafer. In step 61 a silicon oxide layer is formed in the V-groove.

In step 62 an aluminium layer is deposited on a lower portion of an optical component, such as a ball lens. In step 63 the ball lens is placed in the V-groove such that the aluminium layer on the lower portion of the ball lens contacts the oxide layer of the V-groove in such way that the optical axis is not covered by the aluminium layer. A step of aluminium oxide bonding is performed in step 64 in order to affix the ball lens to the wafer.

Figure 7:
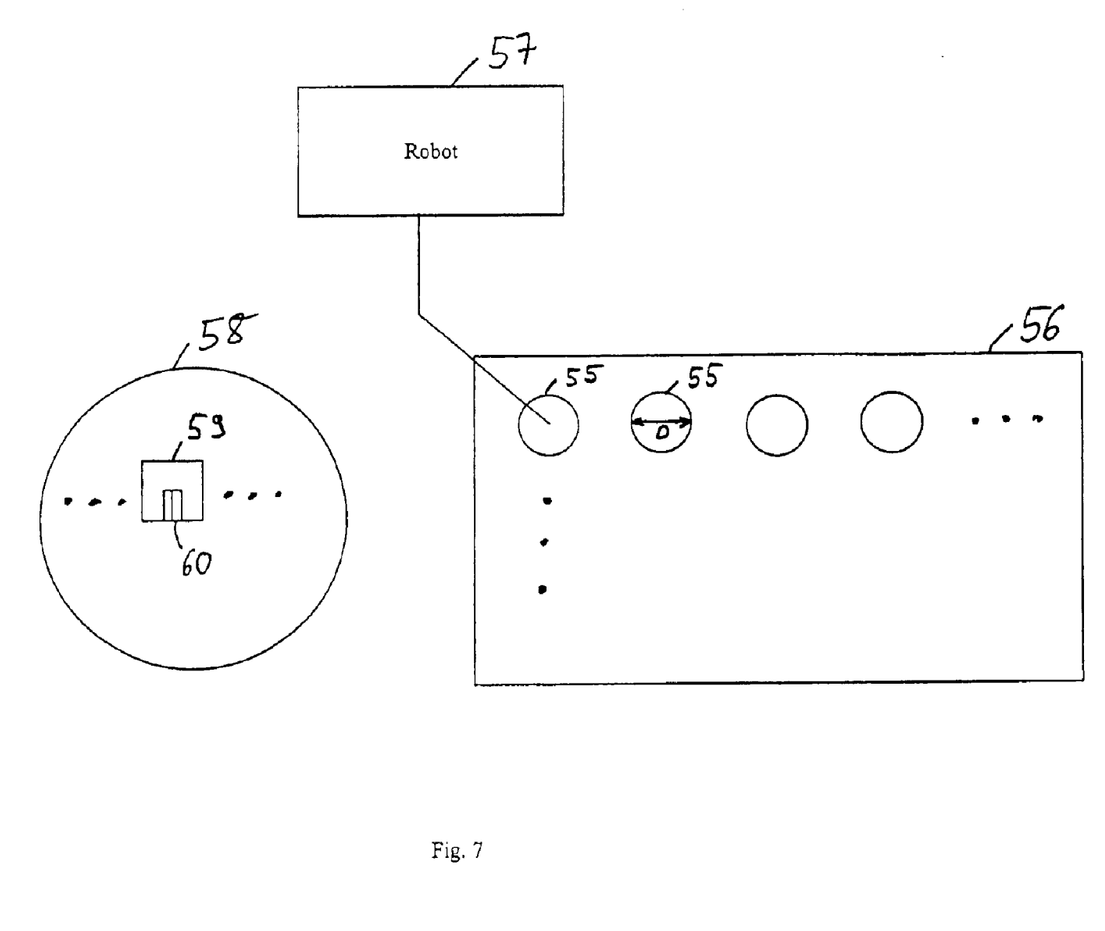
FIG. 7 is a schematic diagram illustrating the fabrication of an optical module in accordance with FIGS. 5 and 6.

FIG. 7 shows a schematic diagram of a manufacturing set-up in order to carry out a method in accordance with FIG. 6. The manufacturing equipment comprises a mask or grid 56 having a number of openings 55 being arranged in a matrix. Each of the openings 55 has a diameter of D. Each opening 55 serves to receive a ball lens (cf. ball lens 50 of FIG. 5).

When a ball lens 50 is placed in an opening 55 the lower portion of the ball lens 55 is received within the opening 55 such that the lower portion extends through the opening 55 to the backside of the grid 56. This way the lower portion of the ball lens 50 is delimited by the diameter D (cf. FIG. 5).

After a number of ball lenses 50 have been placed on the grid 56 the grid 56 is brought into a deposition chamber (vapour dep. or sputtering) in order to deposit an aluminium layer (cf. aluminium layer 51 of FIG. 5) from the backside of the grid 56. No aluminium is deposited on the upper portions of the ball lenses 50.

A wafer 58 has a number of submounts 59. A V-groove 60 is formed in each of the sub-mounts 59. Each V-groove 60 serves to receive and position one of the ball lenses 50 (cf. FIG. 5). A ball lens is picked from an opening 55 by a robot 57 and placed within the V-groove 60 of the sub-mount 59. Due to an initial alignment of the aluminium covered part of the component with respect to the v-groove—given by the technical set-up—an additional orientation step can be omitted.

Usually the submounts are separated prior to the mounting of the ball lens inside the v-groove.

Taking into account the herein described invention a modified mounting of ball lenses in v-grooves is devised: The positioning of ball lenses from grid 56 is done step by step for all ball lenses 50 within openings 55 such that all submounts 59 receive at least one ball lens 50. When the optical components are placed in the sub-mounts 59 an aluminium-oxide bonding step is performed with respect to the wafer 58 in order to bond the ball lenses within respective V-grooves 60 at the same time. After the bonding the submounts 59 are separated into individual optical modules (cf. optical module 1 of FIG. 1).

| list of reference numerals | |
|---|---|
| optical module | 1 |
| silicon substrate | 2 |
| ball lens | 3 |
| optical axis | 4 |
| oxide layer | 5 |
| wall | 6 |
| wall | 7 |
| aluminium layer | 8 |
| opening | 9 |
| laser | 10 |
| wall | 11 |
| underlayer | 12 |
| ball lens | 50 |
| aluminium layer | 51 |
| V-groove | 52 |
| wall | 53 |
| wall | 54 |
| opening | 55 |

-continued

| list of reference numerals | |
|---|---|
| grid | 56 |
| robot | 57 |
| wafer | 58 |
| submount | 59 |
| V-groove | 60 |

What is claimed is:

1. A method of manufacturing an optical module, the method comprising:

provinding a groove in a first side of a substrate for positioning a ball lens, wherein the groove is configured to create an opening in a second side of the substrate;

placing the ball lens in the groove, wherein the ball lens has an oxide coating; and depositing an aluminum layer on the second side of the substrate that extends through the opening to a lower portion of the optical component, wherein the optical component is secured within the groove by means of an aluminum-oxide bonding process.

2. The method of claim 1, further comprising the step of heating the aluminum layer to increase the strength of the aluminum-oxide bond.

3. The method of claim 1, further comprising the step of adding an additional metal layer to the aluminum layer on the second side of the substrate to increase the strength of the optical module.

4. The method of claim 1, wherein the oxide coating comprises silicon oxide.

5. The method of claim 1, wherein the groove is anisotropically etched into the substrate.

6. A method of manufacturing an optical module, the method comprising:

forming a groove in a substrate for positioning a ball lens;

forming an oxide layer in the groove;

depositing an aluminum layer on a lower portion of the ball lens, wherein the step of depositing includes:

placing each of a plurality of ball lenses in a corresponding opening in a first side of a grid, wherein each opening has a diameter, D, such that a lower portion of each ball lens delimited by the diameter, D, extends through the first side of the grid to a second side of the grid, wherein the plurality of ball lenses includes the first ball lens, and depositing an aluminum layer on the second side of the grid such that only the lower portion of each ball lens delimited by the diameter, D, receives an aluminum coating wherein the diameter, D, is configured such that the aluminum coating do not cover the optical axes of the ball lenses;

placing the first ball lens in the groove such that the aluminum coating on the lower portion of the first ball lens contacts the oxide layer; and using a thermo-compression bonding process to create an aluminum-oxide bond to secure the first ball lens within the groove.

7. The method of claim 6, wherein the oxide coating comprises silicon oxide.

8. The method of claim 6, wherein the groove is anisotropically etched into the substrate.

9. The method of claim 6, wherein the first ball lens is placed in the groove using a pick-and-place means.

10. The method of claim 6, wherein the step of depositing the aluminum layer includes placing the grid in a deposition chamber to deposit the aluminum layer.

11. The method of claim 6, wherein a temperature on the order of 300 degrees Celsius applied during the thermo-compression bonding process.

12. The method of claim 6, wherein the thermo-compression bonding process includes applying pressure such that an aluminum oxide layer formed on the first ball lens during the step of placing is cracked in order to bring pure aluminum deposited on the first ball lens into contact with silicon dioxide formed in the groove.

\* \* \* \* \*